(12) United States Patent
Kim

(10) Patent No.: US 8,088,700 B2
(45) Date of Patent: Jan. 3, 2012

(54) SEALING GLASS COMPOSITION FOR INTERMEDIATE-TEMPERATURE PLANAR SOFC

(75) Inventor: Byong Soo Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 352 days.

(21) Appl. No.: 12/430,278

(22) Filed: Apr. 27, 2009

(65) Prior Publication Data

US 2010/0016142 A1 Jan. 21, 2010

(30) Foreign Application Priority Data

Jul. 15, 2008 (KR) .......................... 10-2008-068747

(51) Int. Cl.
  *C03C 8/24* (2006.01)
  *C03C 8/14* (2006.01)
  *C03C 1/00* (2006.01)
  *C03C 14/00* (2006.01)
  *C03C 3/078* (2006.01)
(52) U.S. Cl. ................. 501/15; 501/17; 501/32; 501/77
(58) Field of Classification Search .................... 501/15, 501/17, 77, 32
  See application file for complete search history.

(56) References Cited

U.S. PATENT DOCUMENTS

| 6,271,157 B1 | 8/2001 | Vignali et al. |
| 6,362,119 B1 * | 3/2002 | Chiba ............................. 501/15 |
| 6,376,055 B1 * | 4/2002 | Kishida et al. ................ 428/210 |
| 2005/0170233 A1 | 8/2005 | Beatty et al. |

FOREIGN PATENT DOCUMENTS

| EP | 0 018 190 A1 | 10/1980 |
| KR | 10-1999-0049582 A | 7/1999 |
| KR | 10-2005-0071887 A | 7/2005 |
| KR | 10-2007-0100826 A | 10/2007 |
| WO | WO 9932282 A1 * | 7/1999 |

* cited by examiner

*Primary Examiner* — David M. Brunsman
*Assistant Examiner* — Kevin Johnson
(74) *Attorney, Agent, or Firm* — Edwards Wildman Palmer LLP; Peter F. Corless

(57) ABSTRACT

The present invention relates to a sealing glass composition for an intermediate-temperature planar SOFC, and a composition herein comprises a mixture of BaO, $Al_2O_3$, $B_2O_3$ and $SiO_2$ in a particular mixing ratio and a metal oxide such as $CeO_2$, $Fe_2O_3$, $Mn_2O_3$ and $Cr_2O_3$, thereby enabling the SOFC to efficiently operate at an intermediate temperature. The composition for a planar SOFC satisfies thermal properties, mechanical properties and electric properties that are required as a sealing glass for an intermediate-temperature SOFC, and also prevents the mixing between fuel gas and air, thereby being useful for the commercialization of SOFCs.

4 Claims, 6 Drawing Sheets

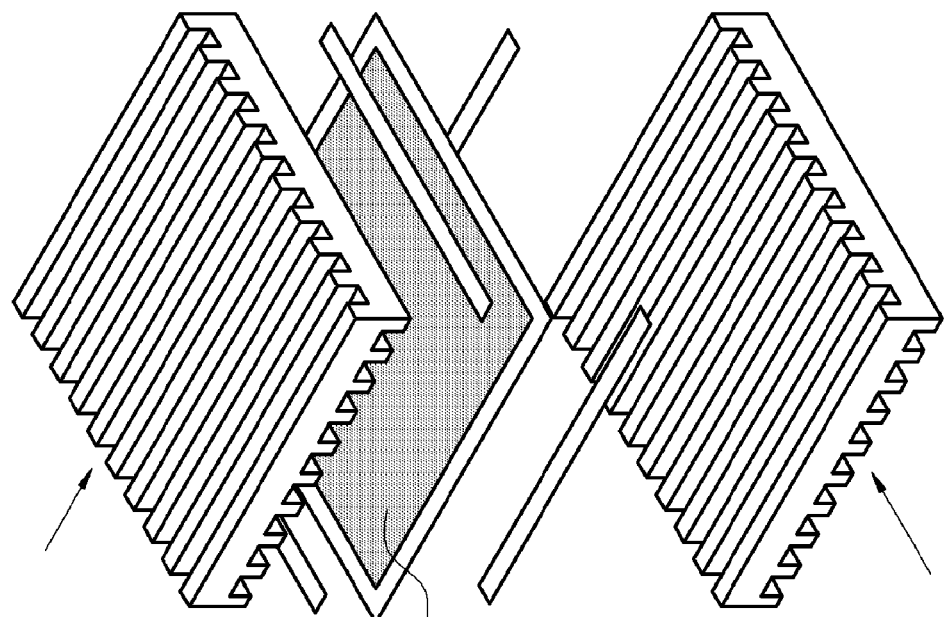
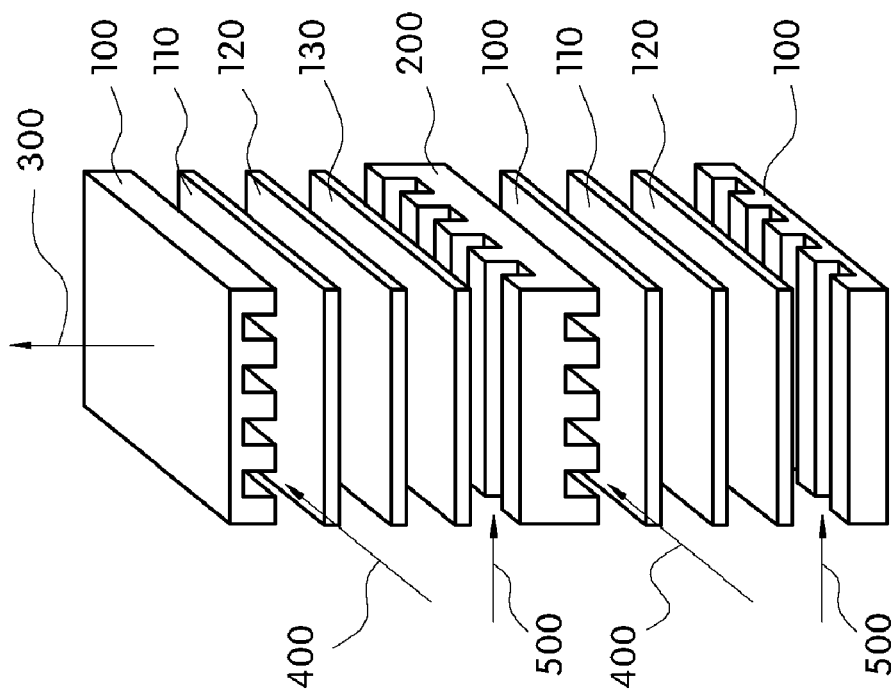
Fig. 1

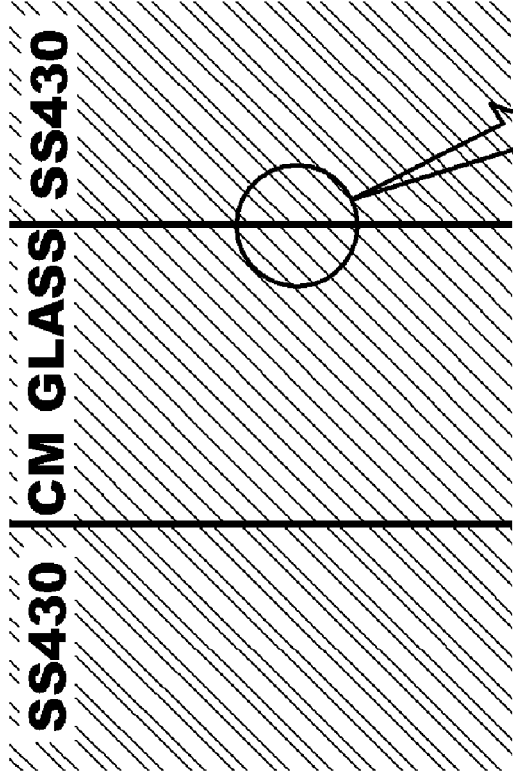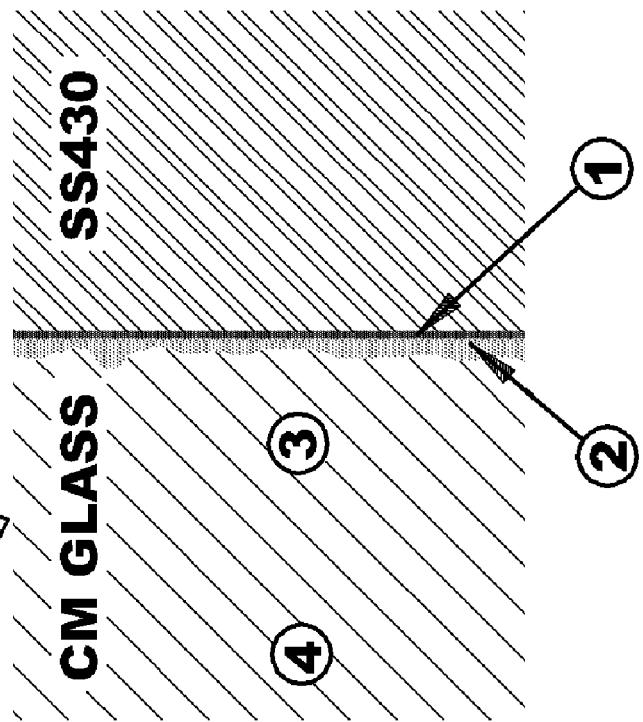
Fig. 4

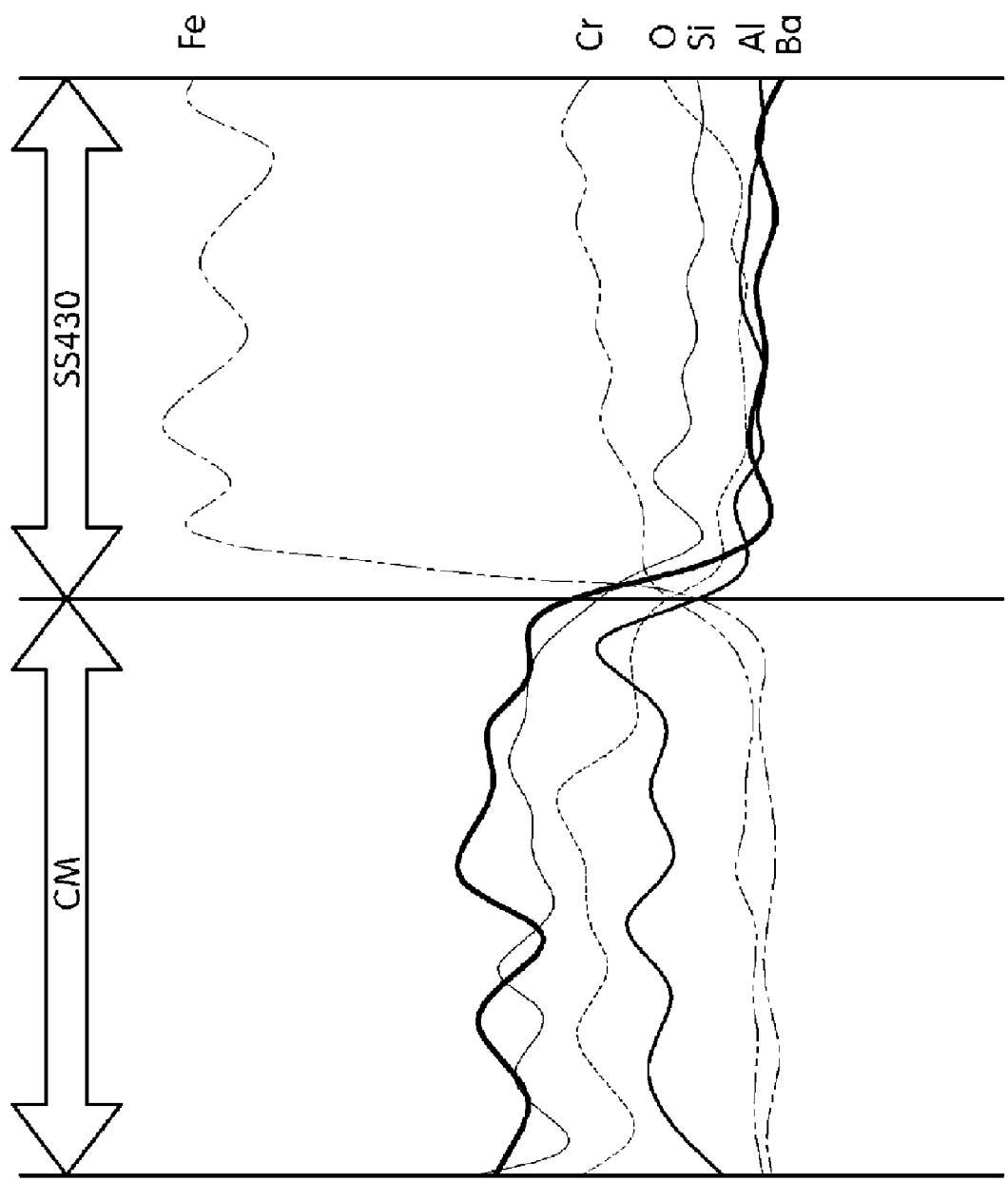

though the planar stack is superior to the cylindrical stack in efficiency and power density due to a relatively shorter circuit route, it has the following drawbacks: (i) ductile fracture is easily caused by ceramic composites, a main

SEALING GLASS COMPOSITION FOR INTERMEDIATE-TEMPERATURE PLANAR SOFC

CROSS-REFERENCE TO RELATED APPLICATION

This application claims under 35 U.S.C. §119(a) the benefit of Korean Patent Application No. 10-2008-0068747 filed Jul. 15, 2008, the entire contents of which are incorporated herein by reference.

BACKGROUND (a) Technical Field

The present invention relates to a sealing glass composition for an intermediate-temperature planar solid oxide fuel cell (SOFC).

(b) Background Art

Extensive researches have recently been exerted for the commercialization of an intermediate-temperature SOFC having an operation temperature of 600-800° C. The intermediate-temperature SOFC has many advantages over a high-temperature SOFC having an operation temperature of 800-1000° C. For example, while a ceramic interconnector is required for the high-temperature SOFC, a metallic interconnector, which is cheaper than the ceramic interconnector, can be used for the intermediate-temperature SOFC. In addition, the intermediate-temperature SOFC can considerably reduce the manufacturing cost by providing manufacturers with more options in selecting the design and material of BOP (balance of plant), which accounts for about 50% of the manufacturing cost of SOFC system. Further, as the operation temperature decreases, durability increases due to the facilitated thermal cycle treatments such as start-up and shut-down.

In general, SOFCs can be classified depending on the shape of stack. Cylindrical stack is prepared by connecting cylindrical unit cells, and planar stack is prepared by stacking planar unit cells. Cylindrical stack is structurally more stable than planar one and does not require gas sealing, while it has drawbacks such as a relatively lower power density, higher manufacturing cost and poor scalability.

Planar stack can be prepared by forming unit cells and sintering them together. Although this process is simple, it is technically limited due to the difficulty in sintering various materials having different properties. Planar stack can also be formed by sintering each of unit cells separately, which process is widely studied in fuel cells.

Techniques for manufacturing the separate stack are at the level of commercialization because stacks having power of kWs have already been developed. A key point for full commercialization of the separate-stack SOFC lies in designing an optimized system and increasing the long-term stability and economic efficiency of stacks.

In the intermediate-temperature planar SOFC, $CeO_2$-based material more ion-conductive than YSZ is used as electrolyte, nickel-ceria(Ni-SDC)-based material is used as a fuel electrode, and LSM ($La_{0.65}Sr_{0.35}MnO_3$) is used as an air electrode. In particular, stainless steel (Fe—Cr-based alloy) can be used as an interconnector instead of a metal due to a relatively low operation temperature, thereby considerably reducing the manufacturing cost.

Although the planar stack is superior to the cylindrical stack in efficiency and power density due to a relatively shorter circuit route, it has the following drawbacks: (i) ductile fracture is easily caused by ceramic composites, a main ingredient in stack, and (ii) the preparation process is complicated. In particular, the development of a sealant for sealing the SOFC-constructing elements is required. When fuel gas is mixed with air at a high temperature, air-induced oxidation of fuel gas causes abrupt heat generation or explosion, thereby damaging SOFC stacks with the operation suspended. The mixture of two gases also lowers partial pressure of each gas, and thus reduces electromotive force according to the Nernst-Einstein equation, thereby preventing a normal power generation.

There have been various attempts made to develop a sealing method and a sealant that can satisfy both long-term sealing performance and material reliability. However, technical development is insufficient for the commercialization of SOFC. It is difficult to develop a sealant which meets the following requirements.

First, it needs to be sufficiently bound to SOFC-constituting elements such as a cathode, an anode, a solid electrolyte and an interconnector so as to maintain non-weakened binding region despite repeated heating and cooling.

Second, it needs to have a thermal expansion coefficient similar to that of a solid electrolyte, a cathode and an interconnector, which is $11–12 \times 10^{-6}$/° C. (In general, the greater the difference in thermal expansion coefficient between the SOFC-constituting elements and the sealant, the more frequent the interfacial failure.)

Third, it needs to have a wetting contact angle of higher than 90° when contacting SOFC elements in order to prevent its penetration into micro-pores that can be caused by a capillary phenomenon occurred when it contacts a micro-structured electrode.

Fourth, it needs to be chemically inert without being eroded at the operation temperature of SOFC.

Fifth, it needs to survive extreme conditions for oxidation or reduction without being chemically decomposed or evaporated.

Sixth, it needs to have a specific electric resistance of higher than $10^4 \Omega \cdot cm$ at the operation temperature of SOFC so as to maintain electric insulation between SOFC elements while preventing a fuel gas from being mixed with air.

Extensive researches have been conducted to use a glass material as a sealant for SOFC for it satisfies the aforementioned requirements. Initially, a glass material used for window glass such as soda-lime silicate, alkali silicate, alkali-earth silicate and alkali borosilicate glass was used as a sealant. However, these materials are inappropriate because they react with SOFC-constituting elements and tend to be leaked due to a significantly low viscosity at the operation temperature.

Borosilicate glass such as Pyrex has a much smaller coefficient of thermal expansion ($3.2 \times 10^{-6}/20$ C.) than that of SOFC-constituting elements, which results in a relatively high thermal stress. (Alkali-earth silicate)-based glass has been studied only on the composition used in relatively high temperature of 700° C. or higher. Although attempts have recently been made to use mica, a high-temperature elastomer, mainly by U.S. Pacific Northwest National Laboratory, no satisfactory results have been reported due to the structural problems of mica.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present inventors have discovered that a sealing glass composition comprising BaO, $Al_2O_3$, $B_2O_3$ and $SiO_2$ in a particular ratio, along with a SOFC-constituting metal oxide such as $CeO_2$, $Fe_2O_3$, $Mn_2O_3$ and $Cr_2O_3$ is suitable for a sealing glass for an intermediate-temperature planar SOFC.

The present invention relates to a sealing glass composition comprising: (a) a parent glass comprising 35-45 wt % of BaO, 25-35 wt % of $SiO_2$, 10-20 wt % of $B_2O_3$ and 8-15 wt % of $Al_2O_3$; and (b) 1-5 wt % of at least one metal oxide selected from the group consisting of $CeO_2$, $Fe_2O_3$, $Mn_2O_3$ and $Cr_2O_3$ relative to 100 weight parts of the parent glass.

The sealing glass composition satisfies the thermal, mechanical and electrical properties required as a sealing glass for an intermediate temperature SOFC.

BRIEF DESCRIPTION OF DRAWINGS

The above and other features of the present invention will now be described in detail with reference to certain exemplary embodiments thereof illustrated the accompanying drawings which are given herein below by way of illustration only, and thus are not limitative of the present invention, and wherein:

FIG. 1 schematically shows a planar SOFC;

FIG. 4 is SEM photographs showing the interface between sample CM and metallic interconnector SS430 before and after the thermal treatment in air at 700° C. for 100 hours;

FIG. 6 is linear EDS photographs showing the interface between sample CM and metallic interconnector SS430 before and after the thermal treatment in air at 700° C. for 100 hours.

Figure 2:
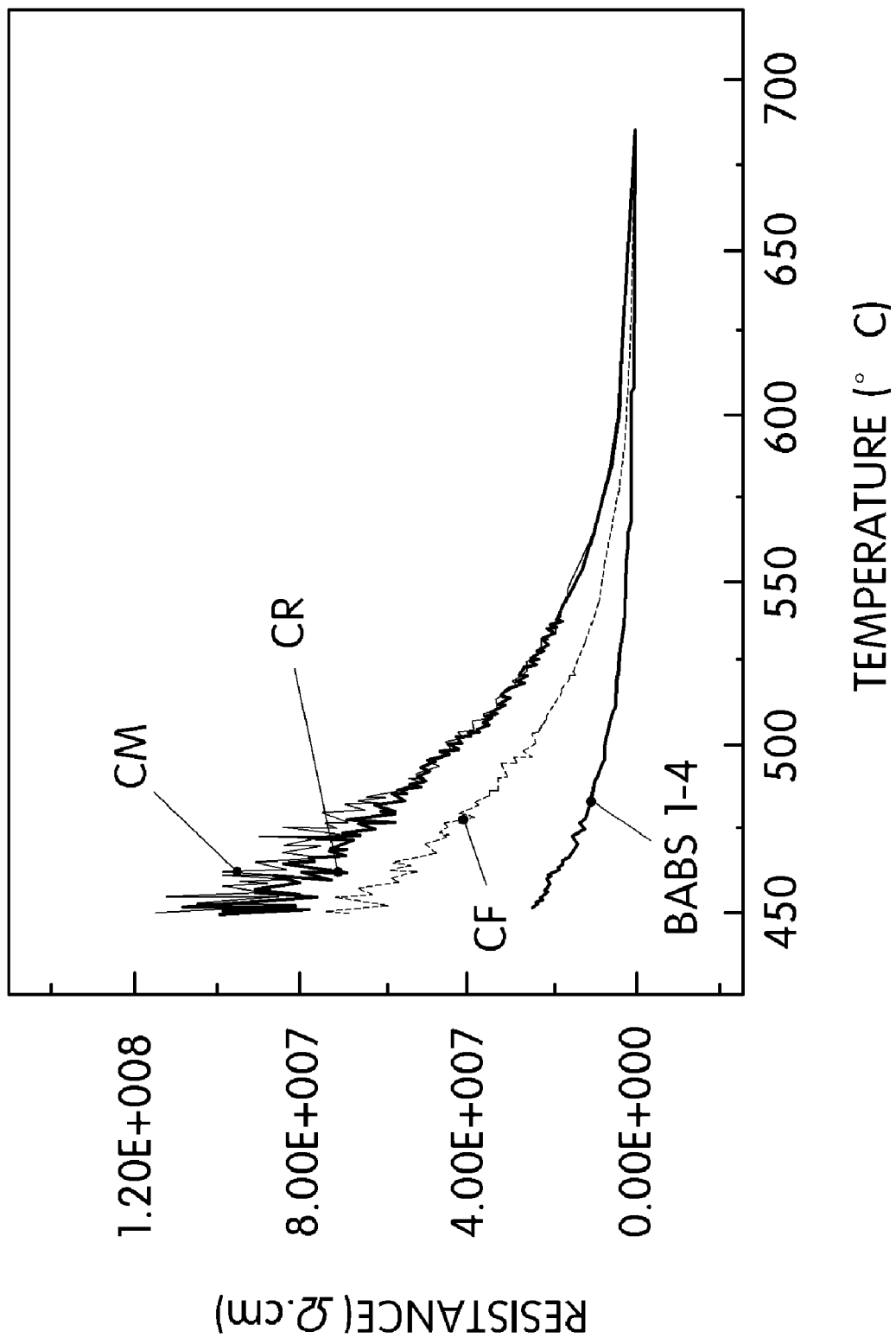
FIG. 2 is a graph showing temperature-dependent electrical resistance of each sample prepared in Example 1.

Reference numerals set forth in the Drawings includes reference to the following elements as further discussed below.

| |
|---|
| 100: End plate |
| 110: Anode |
| 120: Electrolyte) |
| 130: Cathode |
| 200: Bipolar plate |
| 300: Current flow |
| 400: Fuel flow |
| 500: Oxygen flow |
| 600: Sealing glass |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

The present invention relates to a sealing glass composition for a planar SOFC comprising: (a) a parent glass comprising 35-45wt % of BaO, 25-35 wt % of $SiO_2$, 10-20 wt % of $B_2O_3$ and 8-15 wt % of $Al_2O_3$; and (b) 1-5 wt % of a metal oxide selected from the group consisting of $CeO_2$, $Fe_2O_3$, $Mn_2O_3$ and $Cr_2O_3$ relative to 100 weight parts of the parent glass.

BaO—$Al_2O_3$—$B_2O_3$—$SiO_2$-based glass (referred to as "BABS-based glass" hereinafter) is not suitable for a sealing glass in terms of glass transition temperature, thermal expansion coefficient and crystallization temperature although thermal property can be easily be adjusted by controlling the ratio $SiO_2$ to $B_2O_3$. While attempting to satisfy the requirements of intermediate-temperature SOFC sealing glass by the addition of other oxides, the present inventors have discovered that including in a sealing glass composition an oxide or oxides selected from oxides compounds constituting SOFC improves the bonding property between SOFC and the sealing glass.

$B_2O_3/SiO_2$ ratio of 1 or lower is preferred. If the ratio is higher than 1, $B_2O_3$ produces pores as $B_2O_3$ volatilizes and thereby lowers a softening point.

Under a particular $B_2O_3/SiO_2$ ratio, coefficient of thermal expansion (CTE) increases as BaO content increases independently of $Al_2O_3$ content. This is because Ba, among cations constituting BABS-based glass, is the smallest in ionic field strength and affects the weakening of glass structure and the increase in CTE. Further, glass transition temperature and softening point vary narrowly as BaO content increases. This is because glass transition temperature and softening point depend more on $B_2O_3/SiO_2$ ratio in BABS-based glass.

However, when BaO content is higher than 45 wt %, glass transition temperature and softening point drastically decrease due to the weakening of glass structure. $Al_2O_3$ acts as a glass stabilizer, and is preferred to be contained in a parent glass composition in the amount of 8-15 wt %.

BABS-based glass composition is still not suitable for an SOFC sealing glass despite the adjustment of the weight ratios of BaO, $Al_2O_3$, $B_2O_3$ and $SiO_2$ because it shows a relatively high glass transition temperature with an insufficient high-temperature flow stability and also differs from other SOFC-constituting materials in coefficient of thermal expansion. According to the present invention, a particular oxide or oxides are added in the amount of 1-5 weight parts relative to 100 weight parts of a parent glass comprising BaO, $Al_2O_3$, $B_2O_3$ and $SiO_2$, thereby overcoming the above-described problems.

Preferably, a metal oxide or oxides constituting an SOFC are added in order to increase the bonding property between the SOFC and a metallic interconnector. Preferable examples of the metal oxide herein include $CeO_2$, $Fe_2O_3$, $Mn_2O_3$ and $Cr_2O_3$, which are used for an electrolyte, an anode and interconnector (SS430) in an intermediate temperature SOFC.

Even a small amount of $CeO_2$ can lower glass transition temperature and softening point, and improve high-temperature flow stability due to widened gap between glass transition temperature and softening point. Further, $CeO_2$ is a strong oxidant that can inhibit the eduction of a metal in the manufacture of a glass. Scheme 1 shows how $CeO_2$ acts as an oxidant.

Scheme 1

$4CeO_2 \leftrightarrow 2Ce_2O_3 + O_2$ (at a temperature of 1400° C. or higher)

EXAMPLES

The following examples illustrate the invention and are not intended to limit the same.

Glass-forming raw powders of $BaCO_3$ (CERAC, 99.9%), $Al_2O_3$ (HIGH PURITY CHEMICAL, 99.9%), $B_2O_3$ (HIGH PURITY CHEMICAL, 99.9%), $SiO_2$ (HIGH PURITY CHEMICAL, 99.9%), $CeO_2$ (HIGH PURITY CHEMICAL, 99.9%), $Fe_2O_3$ (HIGH PURITY CHEMICAL, 99.9%), $Mn_2O_3$ (HIGH PURITY CHEMICAL, 99.9%) and $Cr_2O_3$ (HIGH PURITY CHEMICAL, 99.9%) were weighed as shown in Table 1, and well mixed according to a wet mixing method by using zirconia balls.

TABLE 1

| Samples | Content (wt %) | | | | | | | |
|---|---|---|---|---|---|---|---|---|
| | $SiO_2$ | $Al_2O_3$ | $B_2O_3$ | BaO | $CeO_2$ | $Mn_2O_3$ | $Fe_2O_3$ | $Cr_2O_3$ |
| BABS1-4 | 30 | 10 | 15 | 45 | | | | |
| CM | 30 | 10 | 15 | 41 | 2 | 2 | | |
| CF | 30 | 10 | 15 | 41 | 2 | | 2 | |
| CR | 30 | 10 | 15 | 42 | 2 | | | 1 |

Each of mixed powders was placed in a Pt melting pot and melt by using a super kanthal furnace at 1500-1600° C. The mixture was poured into a stainless steel mold for a rapid cooling, and internal strains were removed by annealing at 600° C.

Properties of sealing glass samples were measured, and coefficient of thermal expansions are provided in Table 2.

TABLE 2

| Samples | Tg (° C.) | Ts (° C.) | Thermal expansion coefficient (100-550° C.) |
|---|---|---|---|
| BABS1-4 | 590 | 627 | $9.84 \times 10^{-6}$/° C. |
| CM | 570 | 620 | $11.63 \times 10^{-6}$/° C. |
| CF | 575 | 620 | $11.20 \times 10^{-6}$/° C. |
| CR | 574 | 637 | $11.5 \times 10^{-6}$/° C. |

The softening points, glass transition temperatures and thermal expansion coefficients of samples CM, CF and CR ascertain that the samples show thermal properties suitable as a sealing glass of an intermediate-temperature SOFC.

Specific resistances of the samples were measured at various temperatures, and the results are provided in FIG. 2. This ascertains that the samples show electrical insulating properties required as a sealing glass.

Figure 3:
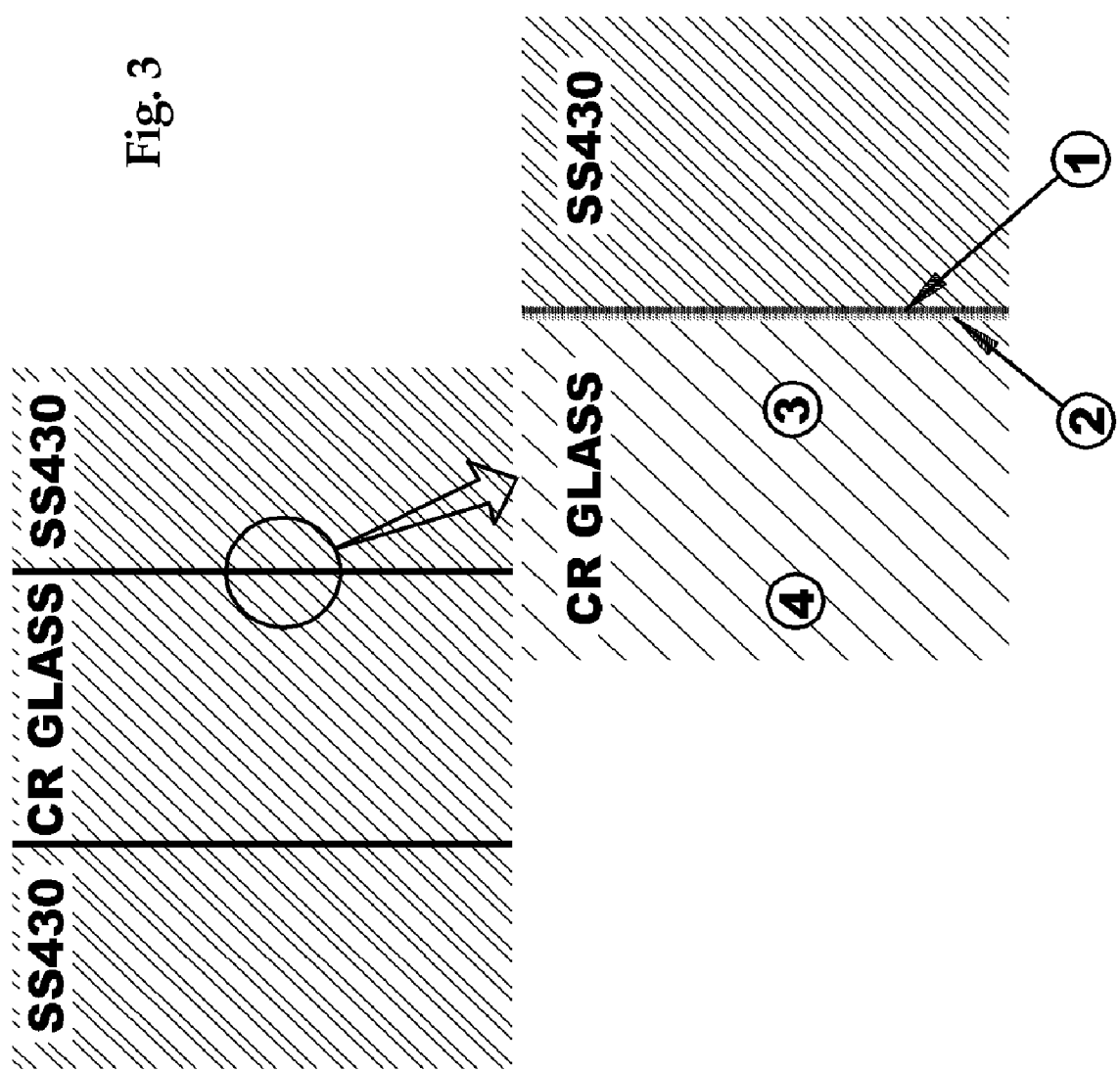
FIG. 3 is SEM photographs showing the interface between sample CR and metallic interconnector SS430 before and after the thermal treatment in air at 700° C. for 100 hours.
Figure 5:
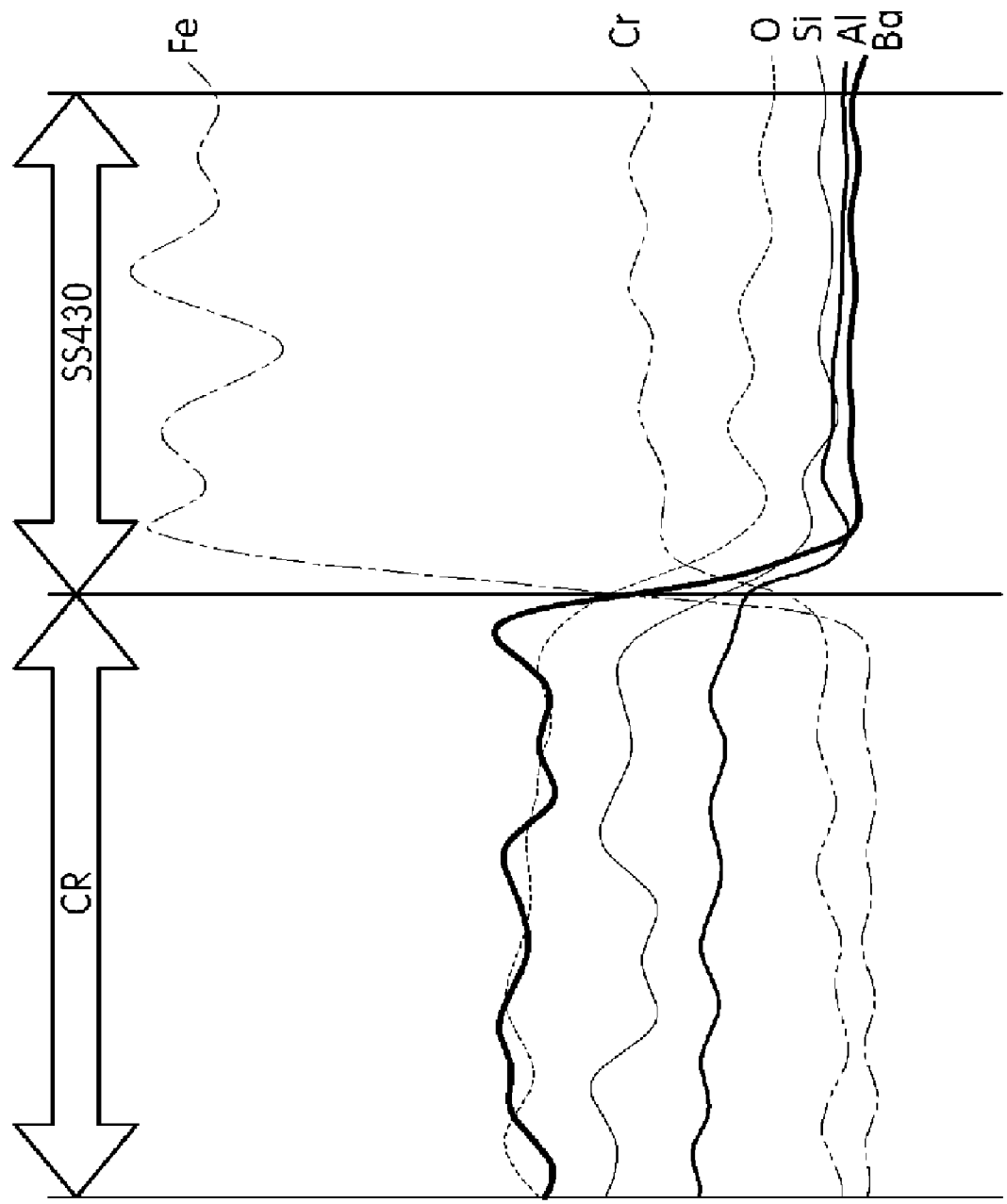
FIG. 5 is linear EDS photographs showing the interface between sample CR and metallic interconnector SS430 before and after the thermal treatment in air at 700° C. for 100 hours.

Each sample was bound to metallic interconnector (SS430), and thermally treated at 700° C. for 100 hours. SEM analysis shows that there was no binding problem in the interface (FIGS. 3 and 4).

If Cr compounds constructing SOFC move towards a sealing glass, the coefficient of thermal expansion of the sealing glass can be lowered due to a relatively low coefficient of thermal expansion of Cr ($6.2 \times 10^{-6}$), thereby deteriorating the interfacial property. Elemental composition was measured near the interface (region shown in FIGS. 3 and 4) by X-ray EDS (Energy Dispersive Spectrometer). Tables 3 and 4 provide the results for samples CR and CM, respectively.

TABLE 3

| | Ingredients (atomic %) | | | | | |
|---|---|---|---|---|---|---|
| | O | Al | Si | Cr | Fe | Ba |
| Point 1 | 48.65 | 4.95 | 10.85 | 2.27 | 2.18 | 31.10 |
| Point 2 | 44.20 | 9.40 | 15.33 | 0.86 | 1.31 | 28.89 |
| Point 3 | 53.77 | 7.37 | 12.44 | 0.34 | 0.21 | 26.54 |
| Point 4 | 51.97 | 8.11 | 11.77 | 0.63 | 0.04 | 28.27 |

TABLE 4

| | Ingredients (atomic %) | | | | | | |
|---|---|---|---|---|---|---|---|
| | O | Al | Si | Cr | Fe | Mn | Ba |
| Point 1 | 40.28 | 4.90 | 11.09 | 4.94 | 9.64 | 10.19 | 18.97 |
| Point 2 | 43.83 | 9.12 | 12.39 | 0.11 | 0.45 | 4.16 | 29.94 |
| Point 3 | 38.15 | 10.03 | 15.16 | 0.05 | 0.10 | 4.22 | 32.73 |
| Point 4 | 57.86 | 3.64 | 7.17 | 0.01 | 4.28 | 2.39 | 29.06 |

Only a negligible amount of Cr was found in the sealing glass, which shows that almost no Cr moved toward the sealing glass by bonding. This ascertains that coefficient of thermal expansion of sample glass is not affected by Cr.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A sealing glass composition for a planar SOFC comprising:
   (a) a parent glass comprising 35-45 wt % of BaO, 25-35 wt % of $SiO_2$, 10-20 wt % of $B_2O_3$ and 8-15 wt % of $Al_2O_3$; and
   (b) 1-5 wt % of $CeO_2$ and one or more metal oxides selected from the group consisting of $Fe_2O_3$, $Mn_2O_3$ and $Cr_2O_3$ relative to 100 weight parts of the parent glass.

2. The composition of claim 1 wherein the composition comprises $Fe_2O_3$.

3. The composition of claim 1 wherein the composition comprises $Mn_2O_3$.

4. The composition of claim 1 wherein the composition comprises $Cr_2O_3$.

* * * * *